(12) United States Patent  
Sakamoto

(10) Patent No.: US 7,113,290 B2
(45) Date of Patent: Sep. 26, 2006

(54) CONTROLLING PRINTER RECEPTION OF PRINT DATA FROM MULTIPLE INTERFACES USING A BUSY STATE

(75) Inventor: Kazuya Sakamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 09/852,663

(22) Filed: May 11, 2001

(65) Prior Publication Data

US 2001/0040691 A1 Nov. 15, 2001

(30) Foreign Application Priority Data

May 12, 2000 (JP) .............................. 2000-139311

(51) Int. Cl.
*G06F 15/00* (2006.01)
(52) U.S. Cl. ...................................... 358/1.1; 358/1.15
(58) Field of Classification Search ................ 358/1.1, 358/1.9, 1.13, 1.15, 402, 474
See application file for complete search history.

(56) References Cited

U.S. PATENT DOCUMENTS

| 5,247,623 | A | * | 9/1993 | Sun ............................. 710/106 |
| 5,791,790 | A | * | 8/1998 | Bender et al. ................ 400/61 |
| 6,070,000 | A | * | 5/2000 | Mori .......................... 358/1.15 |
| 6,661,528 | B1 | * | 12/2003 | Miura et al. ................ 358/1.13 |
| 6,674,538 | B1 | * | 1/2004 | Takahashi ................... 358/1.15 |

\* cited by examiner

*Primary Examiner*—Gabriel I. Garcia
(74) *Attorney, Agent, or Firm*—Fitzpatrick, Cella, Harper & Scinto

(57) ABSTRACT

A printer enters a busy state when a device ID request from a first interface is received. In the busy state, no data is received from a second interface. When data is not received within a predetermined period of time, the busy state is released. Accordingly, a device ID request from the second interface cannot be received within the period of time from reception of the device ID request from the first interface to reception of print data from the first interface. A host connected to the second interface can display the correct printer state.

16 Claims, 2 Drawing Sheets

CONTROLLING PRINTER RECEPTION OF PRINT DATA FROM MULTIPLE INTERFACES USING A BUSY STATE

BACKGROUND OF THE INVENTION

1. Field of the Invention

The present invention relates to printers, and more particularly relates to a printer, which is connected to a plurality of hosts through a plurality of bidirectional interfaces, for selectively using one of the interfaces to receive print data from the hosts and to print the data on paper, a control method for the printer, and a computer-readable storage medium for storing a control program for the printer.

2. Description of the Related Art

In general, a conventional printer which is connected through the Centronics interface to a host such as a personal computer receives a device ID request from the host in accordance with a protocol in conformity with the IEEE (Institute of Electrical and Electronics Engineers) P1284 standard. In response to this, the printer transmits device ID information thereof (the manufacturer name, model number, etc.) and state information thereof (printing, out of paper, paper jam, etc.) to the host. A printer driver in the host transmits the device ID request prior to transmitting print data to the printer, so that the host can determine whether the printer is available for printing data based on a response from the printer. When the host determines that the printer is available, the host transmits print data. If necessary, the host transmits a device ID request to the printer even when the host will not transmit print data. In doing so, the host can determine the state of the printer.

Concerning the above-described type of printer, there is one type of printer which is connected to a plurality of hosts through a plurality of Centronics interfaces. By switching and selectively using one of the interfaces, a single printing device can receive print data from a plurality of hosts and print the data on paper.

Such a conventional printer with the above arrangement receives device ID requests from a plurality of hosts through a plurality of interfaces at arbitrary times. Even when the printer is printing print data from one host, the printer is configured to receive a device ID request from another host. When the printer receives a device ID request through each interface, the printer always transmits a response to the request through the interface.

In the printer having a plurality of interfaces, there is only one receive buffer for storing print data received from the host. It is impossible to simultaneously receive a plurality of pieces of print data through a plurality of interfaces. As a result, the following problems occur.

Specifically, a printer driver in host A sends a device ID request to the printer through one interface and subsequently receives the device ID and state information indicating that the printer is available to receive and print data. Within the short period of time from reception of the information by the printer driver in host A to transmission of print data to the printer, a printer driver in host B sends a device ID request to the printer through another interface in order to print data. Before receiving the print data from host A, the printer is not in a busy state. Specifically, in the busy state, the interface connected to host A is busy, and the printer is permitted to receive print data only using this interface. Since the printer is not in the busy state, the printer transmits the device ID and information indicating that the printer is available to receive and print data to host B.

Immediately after this, the printer driver in host A transmits the print data to the printer. While receiving the print data, the printer enters the busy state in which the printer is monopolized by host A connected to the busy interface. This state differs from that indicated by the information obtained by the printer driver in host B from the printer in response to the device ID request. When the printer driver in host B tries to transmit the print data to the printer through an operation system (OS), the printer cannot receive the data. Due to the incapability of the host and the complexity of the OS, it requires tens of seconds for the printer driver in host B to receive information indicating that the printer cannot receive print data from the OS. Specifically, tens of seconds are necessary to report that the actual state of the printer at the present moment differs from the state of the printer based on the information obtained in response to the device ID request. When the printer driver in host B receives the printer state information in response to the device ID request, and when the state of the printer is displayed on a display of host B based on the printer state information, the state which differs from the actual state of the printer at the present moment is displayed for tens of seconds.

SUMMARY OF THE INVENTION

Accordingly, it is an object of the present invention to provide a printer which performs appropriate processing in response to a device ID request from a host and to prevent the above problems, thereby enhancing the reliability of a printing system including the printer and the host.

To this end, according to an aspect of the present invention, a printer is provided including a first connecting unit for connecting a first interface and a second connecting unit for connecting a second interface. When a device ID request from the first interface is received, a controller causes the printer to enter a busy state in which no data is received from the second interface. When no data is received within a predetermined period of time, the controller releases the busy state.

Further objects, features, and advantages of the present invention will become apparent from the following description of the preferred embodiments with reference to the attached drawings.

DESCRIPTION OF THE PREFERRED EMBODIMENTS

Figure 1:
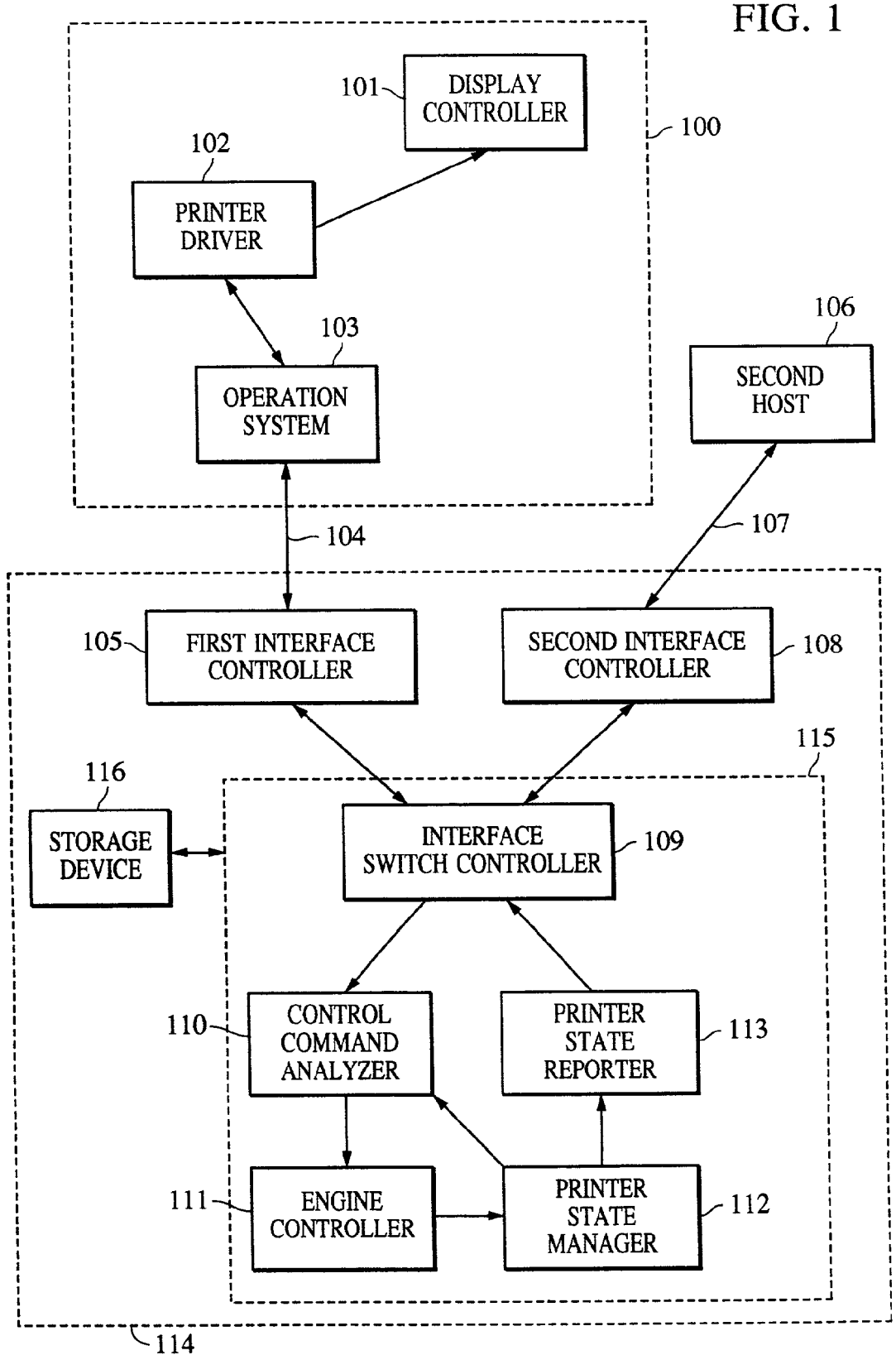
FIG. 1 is a block diagram of the functional structure of a control system of a printer according to an embodiment of the present invention.

The present invention will become apparent from the following description of the preferred embodiments with reference to the accompanying drawings. FIG. 1 shows the functional structure of a control system of a printer according to an embodiment of the present invention.

A printer 114 of the embodiment is connected to a first host 100 and a second host 106, such as personal computers, through a first interface 104 and a second interface 107, respectively.

In the first host 100, a printer driver 102 is activated when printing a document created by a document creation application program (not shown) using the printer 114. Print data for the document is created, and the print data is transmitted to the printer 114 through an operation system (OS) 103 which reads from and writes to a physical printer port and the first interface 104. Prior to this, the printer driver 102 determines whether the printer 114 is available to print data by transmitting a control command to request a device ID to the printer 114 in accordance with the IEEE P1284 protocol. Even when the printer driver 102 does not transmit print data, if necessary, the printer driver 102 transmits a control command to request a device ID in order to determine the state of the printer 114. The printer 114 is in conformity with the IEEE P1284 protocol. When the printer 114 receives the device ID request from the first host 100, the printer 114 transmits device ID information thereof and state information thereof to the first host 100. In response to the device ID request, the printer driver 102 receives the device ID information and the state information of the printer 114 from the printer 114. Based on the information, the printer driver 102 causes a display (not shown) to display the state of the printer 114 for a user using a display controller 101. The second host 106 has the same arrangement as that of the first host 100.

The control system of the printer 114 has the following components.

A first interface controller 105 and a second interface controller 108 process protocols of the first interface 104 and the second interface 107, respectively, and communicates with the first host 100 and the second host 106, respectively. Specifically, the first interface controller 105 and the second interface controller 108 are each formed of an input/output port device and firmware for controlling the input/output port device.

An interface switch controller 109 switches between the first interface 104 and the second interface 107 and selectively uses one of the first interface 104 and the second interface 107. In order to do so, the interface switch controller 109 switches between the first interface controller 105 and the second interface controller 108 and selectively connects one of the first interface controller 105 and the second interface controller 108 to a control command analyzer 110 and a printer state reporter 113 at the subsequent state. The switching is done for every printing job. It is therefore possible to respond to print requests from the first host 100 and the second host 106.

The control command analyzer 110 analyzes a control command from the print data received from the first host 100 or the second host 106 through the first interface 104 or the second interface 107, respectively, which is selected by the switching done by the interface switch controller 109. The control command analyzer 110 converts the control command into an engine control command which causes a printer engine or printing device (not shown) to perform the operation in accordance with the command and outputs the engine control command to an engine controller 111.

The engine controller 111 receives the engine control command from the control command analyzer 110 and controls each part of the printer engine (not shown) in accordance with the engine control command, thus causing the printer engine to feed paper, print data, or expel paper. For example, power is supplied to a heater of a bubble jet (BJ) head, which is used as a recording head (not shown), and ink is ejected. A carriage on which the BJ head is mounted is driven and moved by a pulse motor, so that the position of the BJ head is controlled. Paper is fed from a paper-feed cassette or the like. The fed paper is advanced in the printer 114. Printed paper is expelled.

A printer state manager 112 reports the state of the printer 114, which is reported by the engine controller 111, to the control command analyzer 110 and the printer state reporter 113.

The printer state reporter 113 reports the state of the printer 114, which is reported by the printer state manager 112, to the first host 110 or the second host 106 through the interface switch controller 109.

Hardware including the components 109 to 113 is a CPU 115. A storage device 116 includes a read only memory (ROM) and a random access memory (RAM). The CPU 115 executes a control program stored in the ROM in the storage device 116 in order to perform various functions. A process which will be described hereinafter with reference to FIG. 2 is performed by the CPU 115 in accordance with the control program stored in the ROM in the storage device 116.

The RAM in the storage device 116 is used as a work area for performing various types of information processing. Part of the RAM is used as a reception buffer for temporarily storing print data received from the first host 100 or the second host 106. In the embodiment, one reception buffer is used. In this way, it is impossible to simultaneously receive print data from the first host 100 and the second host 106 through the first interface 104 and the second interface 107.

Figure 2:
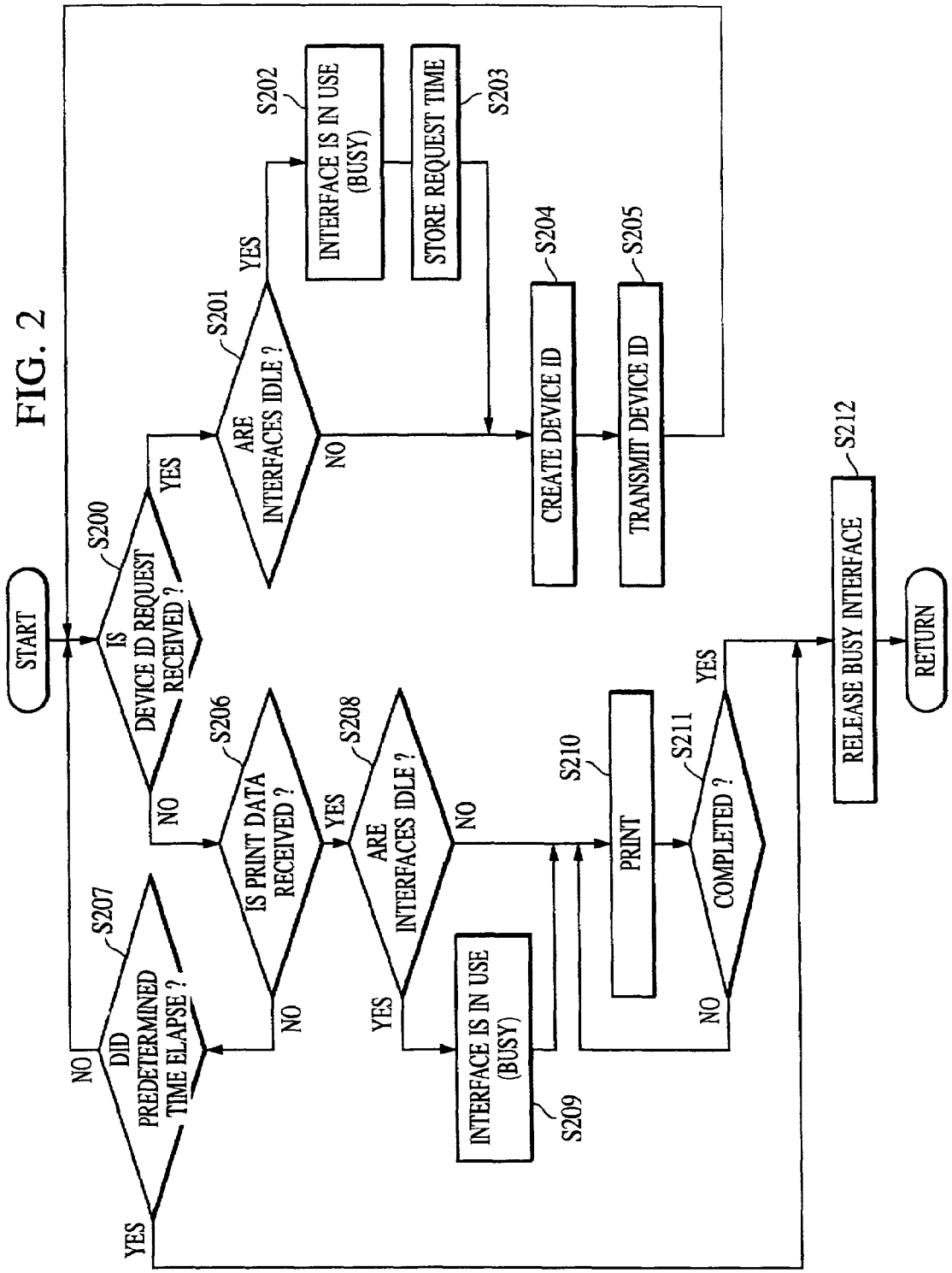
FIG. 2 is a flowchart showing a process of controlling the printer in response to reception of a device ID request and print data.

FIG. 2 is a flowchart showing the operation of the control system of the printer 114 in response to reception of a device ID request and print data from the first host 100 or the second host 106. The process shown in FIG. 2 is mainly performed by a function of the interface switch controller 109.

Referring to FIG. 2, in step S200, the interface switch controller 109 determines whether a device ID request from the first host 100 or the second host 106 is received based on the report by the first interface controller 105 or the second interface controller 108 for detecting a device ID request.

When the device ID request is received, in step S201, the process determines whether the interfaces are idle. Specifically, the interfaces are idle when both the first interface 104 and the second interface 107 are not used for receiving print data and hence are available to print data.

If the process determines in step S201 that the interfaces are idle, in step S202, the process causes one of the interfaces to be in use. Specifically, the process causes the printer 114 to enter a busy state in which the printer 114 is permitted to receive print data from, from among the first interface 104 and the second interface 107, the interface connected to the host that has sent the device ID request (the printer 114 is not permitted to receive print data from the other interface). In other words, the printer 114 is monopolized by the host connected to this interface. In step S203, the process stores, in the RAM in the storage device 116, the time at which the printer 114 becomes busy in response to the reception of the device ID request in which the printer 114 is monopolized by the host connected to the interface. The process proceeds to step S204. In contrast, if the process determines in step S201 that the interfaces are not idle, the process directly proceeds to step S204.

In step S204, the process creates device ID information and printer state information. In step S205, the process transmits the device ID information and the printer state information to the first host 100 or the second host 106 through the first interface controller 105 or the second interface controller 108 which has detected the device ID request. Subsequently, the process returns to step S200.

In contrast, if no device ID request is received, the process determines, in step S206, whether print data is received. If no print data is received, the process determines, in step S207, whether a predetermined period of time elapsed from the time stored in step S203. If the determination is negative, the process returns to step S200.

The determination loop which consists of steps S200, S206, and S208 is executed repeatedly. If it is determined in step S207 that a predetermined period of time, e.g., ten seconds, elapsed, that is, no print data is received within the predetermined period of time since the device ID request was received, the process releases the busy state of the interface in step S212. Subsequently, the process returns to step S200.

In contrast, when it is determined in step S206 that the print data is received, that is, when the print data is received within the predetermined period of time since the device ID request was received, the process determines in step S208 whether the interfaces are idle. If the determination is negative, the process proceeds to step S210. If it is determined that the interfaces are idle, the process sets, in step S209, one of the interfaces to be in use. Specifically, the process causes the printer 114 to enter a busy state in which the printer 114 can receive the print data only using the interface that has received the print data. Subsequently, the process proceeds to step S210. Steps S208 and S209 are provided in order to perform appropriate processing when print data is directly received without reception of a device ID request from a host.

In step S210, the received print data is printed. During printing, the control command analyzer 110 determines whether the printing is completed by checking a code indicating the completion of a series of control commands in the print data and reports the state to the interface switch controller 109. In step S211, the interface switch controller 109 determines whether the printing is completed based on the report from the control command analyzer 110. If the determination is negative, the process returns to step S210 and the printing is continued. If it is determined that the printing is completed, the process releases the busy state of the interface in step S212. Subsequently, the process returns to step S200.

Accordingly, when a device ID request is received from the first host 100 or the second host 106 through the first interface 104 or the second interface 107, respectively, one of the interfaces is caused to be in use. Specifically, the printer 114 enters a busy state in which the printer 114 can receive the print data using one of the interfaces that has received the device ID request. When the print data is received within a predetermined period of time from the reception of the device ID request, the data is printed on paper, and the busy state is released subsequent to the completion of the printing. In contrast, when the print data is not received within the predetermined period of time, the busy state is released after the predetermined period of time elapses. As a result, problems encountered with a conventional system are prevented using the following measures.

Specifically, in order that the printer driver 102 in the first host 100 causes the printer 114 to print data, the printer driver 102 transmits a device ID request to the printer 114 through the first interface 104. When the interfaces are idle, the printer driver 102 receives, from the printer 114, device ID information and information indicating that print data can be received and printed. Within the very short period of time from the obtaining of the information by the printer driver 102 to preparation and transmission of print data to the printer 114, a printer driver in the second host 106 happens to transmit a device ID request to the printer 114 through the second interface 107 in order to print data.

At this moment, the printer 114 is in a busy state in which the printer 114 is monopolized by the first host 100 connected to the first interface 104. In other words, the printer 114 is in a state in which the printer 114 cannot receive print data from the second host 106. Information indicating this state and the device ID information are transmitted from the printer 114 to the second host 106. In this way, the printer driver in the second host 106 does not transmit print data to the printer 114 afterwards.

Unlike the conventional system, within a period of time from obtaining, by one host, in response to a device ID request, printer state information indicating that the printer is available to receive and print data to transmission of the print data to the printer, the state of the printer does not change due to transmission of print data from another host to the printer. The printer state displayed by the former host based on the printer state information obtained in response to the device ID request is not different from the actual printer state at the present moment. Hence, the reliability of a printing system including the printer and the hosts is enhanced.

In the above description, the first interface 104 and the second interface 107 utilize the Centronics interface standard format. Alternatively, the first interface 104 and the second interface 107 can utilize other formats as long as they can transmit device ID requests and respond to the device ID requests in accordance with the above-described protocol. The number of printer interfaces with hosts is not limited to two. Alternatively, three or more interfaces can be used.

As is clear from the above description, according to the embodiment of the present invention, a printer is connected to a plurality of hosts through a plurality of bidirectional interfaces, respectively. By selectively using one of the interfaces, the printer receives print data from the hosts and prints the print data on paper. When a device ID request is received from one of the hosts through one of the interfaces, the printer transmits device ID information thereof and printer state information to the host. When the device ID request is received from one of the hosts through one of the interfaces, the interface is caused to be in use, and the printer enters a busy state in which the printer can receive print data using this interface. When the print data is received within a predetermined period of time since the device ID request is received, the printer prints the print data on paper. Subsequent to the completion of the printing, the busy state is released. When no print data is received within the predetermined period of time, the busy state is released after the predetermined period of time elapses. Unlike the conventional system, during a period of time from the reception, by one host, of printer state information indicting that the printer is available to receive and print data in response to a device ID request to transmission of the print data to the printer, the state of the printer is not changed by the transmission of print data from another host. The former host does not display a printer state which differs from the actual printer state at the present moment, based on the printer state information obtained in response to the device ID request. As a result, the reliability of a printing system including the printer and the hosts is enhanced.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printer, having a first interface and a second interface, comprising:

determining means for determining whether a request for printing to provide a device ID of the printer to another device is received from the first interface;

transmitting means for transmitting the device ID of the printer to the device which transmitted the request and that is connected to the first interface when it is determined by said determining means that the request for printing is received from the first interface; and control means for causing, when it is determined that the request for printing is received from the first interface by said determining means, the second interface of the printer to enter a busy state such that a printing operation is performed wherein data from the second interface is not received and print data from the first interface is received and printed, wherein said control means causes the second interface of the printer to enter the busy state before the reception of the print data from the first interface.

2. A printer according to claim 1, further comprising printing means for performing printing based on the received print data.

3. A printer according to claim 2, wherein said printing means comprises an ink-jet printer.

4. A printer according to claim 1, wherein the first and second interfaces each comprise a Centronics interface.

5. A printer according to claim 1, wherein when the print data is received from the first interface within a predetermined period of time after the second interface of the printer enters the busy state, said control means prints the received print data and, after the printing is completed, said control means releases the busy state.

6. A printer according to claim 1, wherein, said control means releases the busy state of the second interface when no print data is received from the first interface within a predetermined period of time after the second interface of the printer enters the busy state.

7. A control method for a printer having a first interface and a second interface, said control method comprising the steps of:

determining whether a request for printing to provide a device ID of the printer to another device is received from the first interface;

transmitting the device ID of the printer to the device which transmitted the request and that is connected to the first interface when it is determined by said determining step that the request for printing is received from the first interface; and a control step of causing, when it is determined by the determining step that the request for printing is received from the first interface, the second interface of the printer to enter a busy state such that a printing operation is performed wherein data from the second interface is not received and print data from the first interface is received and printed, wherein said control step causes the second interface of the printer to enter the busy state before the reception of the print data from the first interface.

8. A control method according to claim 7, further comprising the step of printing, when the print data is received from the first interface within a predetermined period of time after the second interface of said printer enters the busy state, the received print data and releasing the busy state after the printing is completed.

9. A method according to claim 7, wherein, said control step releases the busy state of the second interface when no print data is received from the first interface within a predetermined period of time after the second interface of the printer enters the busy state.

10. A control program, stored on a computer readable medium, for a printer having a first interface and a second interface, said control program comprising the steps of:

determining whether a request for printing to provide a device ID of the printer to another device is received from the first interface;

transmitting the device ID of the printer to the device which transmitted the request and that is connected to the first interface when it is determined by said determining step that the request for printing is received from the first interface; and a control step of causing, when it is determined by the determining step that the request for printing is received from the first interface, the second interface of the printer to enter a busy state such that a printing operation is performed wherein data from the second interface is not received and print data from the first interface is received and printed, wherein said control step causes the second interface of the printer to enter the busy state before the reception of the print data from the first interface.

11. A control program according to claim 10, further comprising the step of printing, when the print data is received by the first interface within a predetermined period of time after the second interface of said printer enters the busy state, the received print data and releasing the busy state after the printing is completed.

12. A control program according to claim 10, wherein, said control step releases the busy state of the second interface when no print data is received from the first interface within a predetermined period of time after the second interface of the printer enters the busy state.

13. A storage medium on which is stored a control program for a printer having a first interface and a second interface, said control program comprising the steps of:

determining whether a request for printing to provide a device ID of the printer to another device is received from the first interface;

transmitting the device ID of the printer to the device which transmitted the request and that is connected to the first interface when it is determined by said determining step that the request for printing is received from the first interface; and a control step of causing, when it is determined by the determining step that the request for printing is received from the first interface, the second interface of the printer to enter a busy state such that a printing operation is performed wherein data from the second interface is not received and print data from the first interface is received and printed, wherein said control step causes the second interface of the printer to enter the busy state before the reception of the print data from the first interface.

14. A storage medium according to claim 13, wherein said control program further comprises the step of printing, when the print data is received by the first interface within a predetermined period of time after the second interface of said printer enters the busy state, the received print data and releasing the busy state after the printing is completed.

15. A storage medium according to claim 13, wherein, said control step releases the busy state of the second interface when no print data is received from the first interface within a predetermined period of time after the second interface of the printer enters the busy state.

16. A printer, having a first interface and a second interface, comprising:
- a determining unit that determines whether a request to provide printer status information for printing to another device is received from the first interface;
- a transmitting unit that transmits the printer status information of the printer to the device which transmitted the request and which is connected to the first interface when it is determined by the determining unit that the printer status information request for printing is received by the first interface; and
- a control unit for causing, when it is determined by the determining unit that the printer status information request for printing is received by the first interface, the second interface of the printer to enter a busy state such that data from the second interface is not received and print data is received from the first interface and printed,
- wherein said control unit causes the second interface of the printer to enter the busy state before the reception of the print data from the first interface.

* * * * *

UNITED STATES PATENT AND TRADEMARK OFFICE
CERTIFICATE OF CORRECTION

| | |
|---|---|
| PATENT NO. | : 7,113,290 B2 |
| APPLICATION NO. | : 09/852663 |
| DATED | : September 26, 2006 |
| INVENTOR(S) | : Kazuya Sakamoto |

Page 1 of 1

It is certified that error appears in the above-identified patent and that said Letters Patent is hereby corrected as shown below:

COLUMN 4:
Line 7, "host 110" should read -- host 100 --.

COLUMN 7:
Line 32, "wherein" should read -- wherein, --.

Signed and Sealed this

Third Day of July, 2007

JON W. DUDAS
*Director of the United States Patent and Trademark Office*